United States Patent [19]

Renken et al.

[11] Patent Number: 5,415,006
[45] Date of Patent: May 16, 1995

[54] TRANSPORT REFRIGERATION UNIT HAVING MEANS FOR INCREASING THE AMOUNT OF REFRIGERANT CHARGE AVAILABLE

[75] Inventors: David J. Renken, Minneapolis; Curtis G. Yaeger, Prior Lake; Doyle G. Herrig, Elko, all of Minn.

[73] Assignee: Thermo King, Minneapolis, Minn.

[21] Appl. No.: 153,851

[22] Filed: Nov. 18, 1993

[51] Int. Cl.⁶ .................... F25B 49/00; F25B 39/04
[52] U.S. Cl. ........................... 62/196.4; 62/509
[58] Field of Search .................... 62/196.4, 147, 509

[56] References Cited

U.S. PATENT DOCUMENTS

| | | | |
|---|---|---|---|
| 3,370,438 | 2/1968 | Hopkinson | 62/196.4 |
| 3,392,542 | 7/1968 | Nussbaum | 62/196.4 |
| 3,438,217 | 4/1969 | Leimbach | 62/196.4 |
| 4,748,818 | 6/1988 | Satterness et al. | 62/160 |
| 4,903,495 | 2/1990 | Howland et al. | 62/81 |
| 4,912,933 | 4/1990 | Renken | 62/81 |
| 4,932,219 | 6/1990 | Howland et al. | 62/174 |
| 5,056,324 | 10/1991 | Haley | 62/115 |
| 5,157,933 | 10/1992 | Brendel | 62/196.4 |
| 5,172,559 | 12/1992 | Renken et al. | 62/81 |

Primary Examiner—William E. Wayner
Attorney, Agent, or Firm—M. G. Panian

[57] ABSTRACT

A transport refrigeration system having electrical control which controls the temperature in a served space via heating and cooling cycles using hot refrigerant gas from a refrigerant compressor. The refrigeration system has high and low pressure sides. The high pressure side includes a discharge manifold of the compressor, a condenser coil, a refrigerant receiver tank, and an evaporator coil associated with the served space. The low pressure side extends from the evaporator coil to a suction manifold of the compressor. A first controllable refrigerant flow path means is controlled by the electrical control to purge the condenser coil in response to predetermined system parameters, causing refrigerant trapped in the condenser coil to flow to the low pressure side of the system. A second controllable refrigerant flow path is controlled by the electrical control to pressurize the receiver tank in response to predetermined system parameters, forcing refrigerant to flow from the receiver tank to the evaporator coil.

7 Claims, 3 Drawing Sheets

TRANSPORT REFRIGERATION UNIT HAVING MEANS FOR INCREASING THE AMOUNT OF REFRIGERANT CHARGE AVAILABLE

TECHNICAL FIELD

The invention relates in general to transport refrigeration systems, and more specifically to such systems which have means for increasing the amount of refrigerant charge available to the active portion of the system at any instant.

BACKGROUND ART

Transport refrigeration systems for conditioning the loads of trucks, trailers and containers have cooling, null and heating modes. The heating mode includes a heating cycle for controlling load temperature to a selected set point, as well as a heating cycle for defrosting the evaporator coil. When the system switches from a cooling or null mode into a heating cycle, hot compressor discharge gas from a refrigerant compressor is diverted by suitable mode selecting valve means from a cooling cycle refrigerant path, which includes a condenser coil, a receiver tank, an expansion valve, an evaporator coil, and an accumulator, to a heating cycle refrigerant path which includes the compressor, the evaporator coil, and the accumulator.

U.S. Pat. No. 3,370,438 teaches reducing the active size of a condenser coil during low ambient conditions, with the portion of the condenser coil cut out of the active system having a drain line which drains refrigerant from the inactive portion of the condenser coil into the active system.

To make more liquid refrigerant available during a heating cycle, a prior art procedure pressurizes the receiver tank with hot compressor discharge gas to force liquid refrigerant out of the receiver tank and into the refrigerant cooling circuit. This requires an auxiliary hot gas line which runs from the main hot gas line to the receiver tank, along with a by-pass check valve, a by-pass service valve, a receiver tank pressure solenoid, and a condenser check valve. A bleed port in the expansion valve allows the liquid refrigerant forced out of the receiver tank to flow into the evaporator coil during the heating cycle, to improve heating and defrosting capacity.

U.S. Patent No. 4,748,818, which is assigned to the same assignee as the present application, improved upon the aforesaid prior art procedure by connecting the output of the receiver tank to the accumulator during a heating cycle. This eliminated the auxiliary hot gas pressure line to the receiver tank, and the hereinbefore mentioned associated control items.

U.S. Patent No. 4,903,495, which is assigned to the same assignee as the present application, teaches the utilization of a maximum operating pressure expansion valve and a secondary condenser coil to enhance hot gas heating cycles. Refrigerant trapped in the condenser coil and receiver tank is injected into the active refrigerant flow path via the maximum operating pressure valve, when the amount of refrigerant in the active refrigerant flow path is not sufficient to build the pressure on the low pressure side of the system the point necessary to close the maximum operating pressure valve.

U.S. Patent No. 4,912,933, which is assigned to the same assignee as the present application, improved upon the arrangement of the '818 patent by connecting the receiver tank to the accumulator when the need for a heating cycle is detected, with the connection being made before the mode selecting valve means actually switches refrigerant flow to the heating refrigerant flow path. In other words, the need for a heating cycle establishes direct refrigerant flow communication between the receiver tank and accumulator while delaying the switch of the hot gas refrigerant flow from the cooling flow path, which includes the condenser coil and receiver tank, to the heating flow path. This forces refrigerant trapped in the condenser coil and receiver to flow to the lower pressure accumulator, providing an enhancement to the heating and defrost cycles. In both the '818 and '933 patents, the direct fluid flow communication between the receiver tank and accumulator is preferably maintained during the heating cycle, with a check valve preventing reverse flow into the receiver tank.

U.S. Pat. No. 4,932,219, which is assigned to the same assignee as the present application, points out that the problem of trapping refrigerant in the condenser coil and receiver tank, which is worse during low ambient conditions, is even more critical when the transport refrigeration unit is compartmentalized, ie., serving two or more separate conditioned spaces. This patent teaches the selective pressurization of the receiver tank during a heating or defrost cycle, in response to a compressor head pressure below a predetermined value, such as 200 psig. While this teaching is useful in a transport refrigeration system having a single compartment to condition, it is especially useful in compartmentalized transport refrigeration systems having two or more separate compartments to condition.

U.S. Pat. No. 5,056,324, which is assigned to the same assignee as the present application, improves upon the '933 patent by directing refrigerant from the condenser coil and receiver tank, during a time delay purge cycle, into the "heating" refrigerant path, at a point between the "heating" output port of a heat/cool mode selector valve and the evaporator coil, instead of directly into the accumulator, while the mode selector valve is still providing refrigerant to the "cooling" refrigeration path.

U.S. Pat. No. 5,157,933, similar to the 438 patent, teaches draining the condenser coil into the active refrigeration circuit, when the condenser coil becomes inactive, such as during a heating or a defrost cycle.

U.S. Pat. No. 5,172,559, which is assigned to the same assignee as the present application, teaches how to apply the teachings of the '933 patent to a compartmentalized transport refrigeration unit.

During tests of a compartmentalized transport refrigeration unit which utilized receiver tank pressurization during heating and defrost cycles, it was found that in very low ambient conditions the unit could become extremely charge sensitive. If insufficient refrigerant charge was in the active refrigerant flow path during this low ambient condition, it could result in the cooling and heating capacity of the unit slowly diminishing to the point where no cooling or heating would occur. When this happened, the temperatures in the multiple compartments would equalize. It is not desirable to start with a larger amount of refrigerant in these systems, as it increases the size and cost of the receiver and accumulator, which increases the size and cost of the unit.

Thus, it would be desirable, and it is an object of the present invention, to make maximum usage of the refrigerant charge, assuring sufficient charge in the active portion of the system at all times, for proper operation of a transport refrigeration unit, including during low ambient conditions, for both single cargo and compartmentalized transport refrigeration units.

SUMMARY OF THE INVENTION

Briefly, the present invention is a transport refrigeration system having electrical control means which controls the temperature in a served space via heating and cooling cycles using hot refrigerant gas from a refrigerant compressor. The refrigeration system has high and low pressure sides, with the high pressure side including a discharge side or manifold of the compressor, a condenser coil, a refrigerant receiver tank, and an evaporator coil associated with the served space. The low pressure side extends from the evaporator coil to a suction side or manifold of the compressor.

First controllable refrigerant flow path means is controlled by the electrical control means to purge the condenser coil in response to predetermined system parameters, causing refrigerant trapped in the condenser coil to flow to the low pressure side of the system in response to the pressure differential between the condenser coil and the low pressure side of the system. Second controllable refrigerant flow path means is controlled by the electrical control means to pressurize the receiver tank in response to predetermined system parameters, forcing refrigerant to flow from the receiver tank to the evaporator coil.

In one embodiment of the invention, the electrical control means is responsive to pressure in the discharge manifold of the compressor, ie., compressor discharge pressure, and to the system being in a heating or defrost cycle, with the electrical control means causing the first controllable refrigerant flow path means to purge the condenser coil only during a heating or defrost cycle when the compressor discharge pressure is below a predetermined value.

The electrical control means may cause the second controllable refrigerant flow path means to pressurize the receiver tank only when the first controllable refrigerant flow path means is purging the condenser coil; or, optionally, the electrical control means may cause the second controllable refrigerant flow path means to pressurize the receiver tank in response to the compressor discharge pressure being below a predetermined value, regardless of whether the system is in a heating or a cooling cycle.

In a preferred embodiment of the invention, a first controllable valve is disposed to control the flow of hot refrigerant gas from the compressor to the condenser coil, a second controllable valve is disposed to control the flow of hot refrigerant gas from the compressor to the evaporator coil, and the second controllable refrigerant flow path means includes a third controllable valve. A hot gas line is connected to directly connect the discharge side of the compressor to each of the first, second and third controllable valves.

The invention is particularly suitable for use with a compartmentalized transport refrigeration system which holds selected set point temperatures in at least first and second served spaces via heating and cooling cycles via first and second evaporator coils associated with the first and second served spaces, as compartmentalized systems are particularly sensitive to insufficient refrigerant in the active refrigerant flow path. In a compartmentalized system, the electrical control means includes means enabling the first controllable refrigerant flow path means to purge the condenser coil when either of the served spaces is in a heating cycle.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

The present invention modifies the piping diagram and electrical control system shown in the hereinbefore mentioned U.S. Pat. No. 4,932,219, which patent is hereby incorporated into the present application by reference. While the invention may be applied to a single compartment transport refrigeration system, it is especially useful with a compartmentalized transport refrigeration system, and thus the invention will be described relative to a compartmentalized transport refrigeration system.

Figure 1:
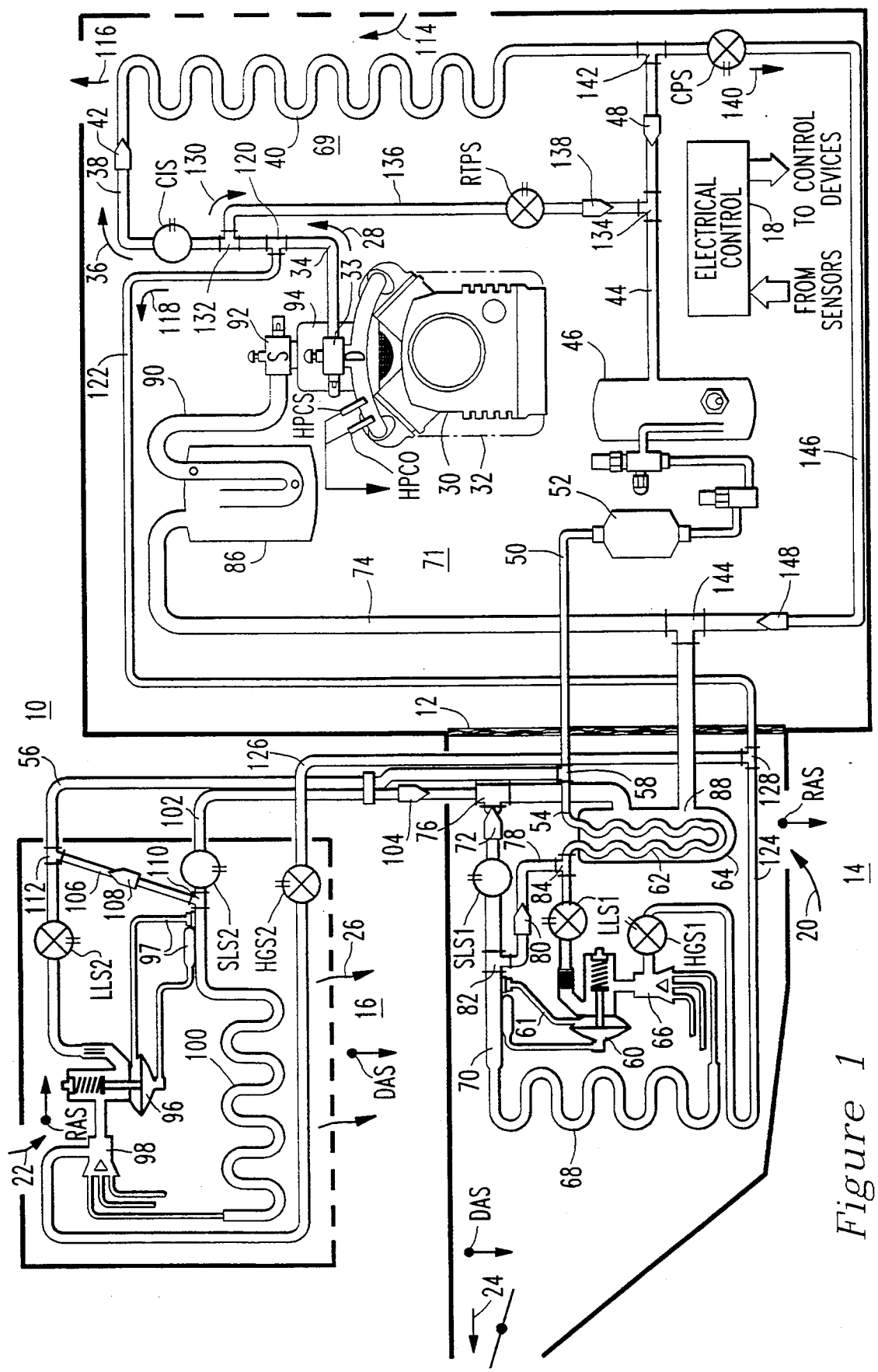
FIG. 1 is a schematic and piping diagram of a compartmentalized transport refrigeration system constructed according to the teachings of the invention.

Referring now to the drawings, and to FIG. 1 in particular, there is shown a compartmentalized, multi-temperature transport refrigeration system 10 constructed according to the teachings of the invention. Transport refrigeration system 10 is associated with a transport type vehicle 12, such as a truck or trailer, having first and second compartments or served spaces 14 and 16, respectively, to be conditioned, but it is to be understood that more than two conditioned spaces may be served. Compartments 14 and 16 may be located serially from the front to the back of the associated vehicle 12, or side-by-side, each extending from the front to the back of the associated vehicle 12, as desired.

System 10 is controlled by electrical control means 18 which includes a thermostat temperature controller and appropriate temperature and pressure sensors, as will hereinafter be described. Electrical control means 18 is described in detail in the incorporated application, and thus only modifications thereof required to understand the present invention are disclosed and described herein. Electrical control means 18 includes one or more temperature sensors disposed in the first and second compartments 14 and 16, such as return air sensors RAS located to sense the temperature of air returning to system 10 from the compartments 14 and 16, and/or discharge air sensors DAS located to sense the temperature of the conditioned air being discharged into the compartments 14 and 16. The arrows connected to the various sensors indicate that the sensors are connected to the electrical control means 18. Air returning from served spaces 14 and 16 is indicated by arrows 20 and 22, respectively, and conditioned air discharged into compartments 14 and 16 is indicated by arrows 24 and 26, respectively. Air is circulated between the compartments 14 and 16 and the system 10 by evaporator blower or fan arrangements (not shown), which may be conventional.

Transport refrigeration system 10 includes a refrigerant flow path 28 through which a refrigerant charge is circulated by a refrigerant compressor 30 having discharge and suction sides or manifolds, indicated generally at D and S, respectively. The flow path 28 between discharge and suction sides D and S of compressor 30 is configurable at any instant by of a plurality of controllable devices, which include controllable valves, such as solenoid operated valves, which devices are under the control of electrical control means 18. Normally open and normally closed controllable valves are respectively indicated in FIG. 1 via an empty circle and via a circle containing an "X", but it will be understood that electrical control means 18 may be changed to reverse the de-energized states shown.

A prime mover for compressor 30, which is indicated generally by broken outline 32, may be an internal combustion engine, an electric motor, or a combination which includes an internal combustion engine for over-the-road use, and a stand-by electrical motor for use when vehicle 12 is stationary and near a source of electrical potential.

In a preferred embodiment of the invention, illustrated in FIG. 1, discharge side D of compressor 30 is connected directly to a plurality of different controllable valves CIS, RTPS, HGS1 and HGS2 via a discharge service valve 33 and a hot gas line 34, rather than being connected to the inlet of a three-way refrigeration circuit selecting valve, such as illustrated in the incorporated patent. The disclosed piping and controllable valve arrangement has certain advantages over arrangements in which the hot gas line is connected to the inlet of a three-way valve, as will be hereinafter explained. First and second pressure switches HPCS and HPCO are disposed to monitor the discharge or head pressure of compressor 30. Switch HPCO is a high head pressure cut-out switch which is arranged to stop prime mover 32, or disconnect compressor 30 from prime mover 32, should the discharge or head pressure of compressor 30 reach a predetermined high value. Switch HPCS is used in the control of system 10, as will be hereinafter explained.

A first refrigerant flow path 36 includes hot gas line 34, a controllable valve CIS, a line 38 from valve CIS to the inlet of a condenser coil 40 which includes a condenser inlet check valve 42, a line 44 from the outlet of condenser coil 40 to the inlet of a receiver tank 46 which includes a condenser outlet check valve 48, a receiver tank 44, and a main liquid line 50 which includes a refrigerant drier 52. In the compartmentalized application selected to illustrate the preferred embodiment of the invention, the main liquid line 50 then divides into first and second sections 54 and 56 at a tee 58. The first and second liquid line sections 54 and 56 respectively extend to first and second evaporator units which are disposed to condition the air of the first and second conditioned spaces 14 and 16.

The first liquid line section 54 extends to a thermostatic expansion valve 60 in the first evaporator unit via a liquid line solenoid valve LLS1 and a first flow path 62 through a heat exchanger 64. Expansion valve 60 is controlled by conventional temperature and pressure lines, indicated generally at 61. The first refrigerant flow path 36 then continues from expansion valve 60 to a refrigerant distributor 66 which distributes refrigerant to the inlets of a plurality of sections of an evaporator coil 68.

The portion of the first refrigerant flow path 36 from the discharge manifold D of compressor 30 to expansion valve 60 defines a high pressure side 69 of system 10. Refrigerant from an outlet header of evaporator coil 76 enters a low pressure side 71 of the refrigerant flow path which includes a suction line section 70. Suction line section 70, which includes a controllable suction line valve SLS1 and a check valve 72, is connected to a main suction line 74 at a tee 76. Suction line section 70 is also connected to the first liquid line section 54 via a by-pass line 78 which includes a check valve 80 oriented to allow refrigerant flow from suction line 70 to liquid line 54. By-pass line 78 is connected to suction line section 70 via a tee 82 disposed between the outlet header of evaporator coil 68 and suction line valve SLS1, and to liquid line section 54 via a tee 84 disposed between the outlet of heat exchanger flow path 62 and liquid line solenoid LLS1.

The first refrigerant flow path 36 then continues from tee 76, via the main suction line 74, to the inlet of a refrigerant accumulator 86. This main suction line flow path between tee 76 and accumulator 86 includes traversing a second flow path 88 of heat exchanger 64.

A suction line section 90 interconnects an outlet side of accumulator 86 to the suction manifold S of compressor 30 via a suction line service valve 86 and a suction line throttling valve 88.

The second liquid line section 56 extends to a thermostatic expansion valve 96 in the second evaporator unit via a liquid line solenoid valve LLS2. Expansion valve 96 is controlled by conventional temperature and pressure lines indicated generally at 97. The second liquid line section 56 may be associated with a heat exchanger similar to heat exchanger 64; or, as illustrated, the second liquid line section 56 may proceed directly from tee 58 to valve LLS2. The first refrigerant flow path 36 then continues from expansion valve 96 to a refrigerant distributor 98 which distributes refrigerant to a plurality of sections of an evaporator coil 100.

Refrigerant from an outlet header of evaporator coil 100 enters the low pressure side 71 of the refrigerant flow path which includes a suction line section 102. Suction line section 102, which includes a controllable suction line valve SLS2 and a check valve 104, is connected to a the main suction line 74 via the tee 76. Thus, while liquid line 56 did not utilize heat exchanger 64, suction line section 102 is directed to tee 76, and thus refrigerant returning to compressor 30 from both evaporator sections flow through the second flow path 88 of heat exchanger 64. The piping arrangement utilized makes this arrangement practical, but as hereinbefore stated, each evaporator section 60 and 62 may be associated with a separate heat exchanger similar to heat exchanger 64, if desired. The flow path from tee 76 to the suction side S of compressor 30 has already been described.

Suction line section 102 is also connected to the second liquid line section 56 via a by-pass line 78 which includes a check valve 108 oriented to allow flow from suction line 102 to liquid line section 56. By-pass line 106 is connected to suction line section 102 via a tee 110 disposed between the outlet header of evaporator coil 100 and suction line valve SLS2, and to liquid line section 56 via a tee 112 disposed between tee 58 and liquid line solenoid LLS2.

The first refrigerant flow path 36, under the control of electrical control means 18, functions as a cooling cycle flow path for either or both the first and second evaporator units, removing heat from the first and second compartments or conditioned spaces 14 or 16, and rejecting heat to ambient via condenser coil 50. Ambient air 114 is drawn into heat exchange relation with condenser coil 40 via a condenser fan or blower (not shown), and heated air 116 is discharged back to ambient.

When either the first or second evaporator unit requires heat for defrosting, or for holding a selected set point temperature, as detected by sensors 20 and 22, electrical control means 18 provides appropriate output signals which close condenser input valve CIS and open a hot gas valve HGS1 or HGS2 of the unit requiring heat. Hot gas from hot gas line 34 is then directed into a second refrigerant flow path 118 from a tee 120 connected in the main hot gas line 34. The second refrigerant flow path 118 includes a hot gas line 122 which divides into first and second hot gas line sections 124 and 126 at a tee 128. The first hot gas line section 124 extends to distributor 66 via the hereinbefore mentioned hot gas solenoid HGS1 and a section of hot gas line 124 which functions as a defrost pan heater. The second refrigerant flow path 118 then continues back to compressor 30 via the same path described relative to the first refrigerant flow path 36. The second hot gas line section 126 extends to distributor 98 via the hereinbefore mentioned hot gas solenoid HGS2 and a section of hot gas line 126 which functions as a defrost pan heater. The second refrigerant flow path 118 then continues back to compressor 30 via the same path described relative to the first refrigerant flow path 36.

A third refrigerant flow path 130 includes means which connects the discharge side D of compressor 30 to receiver tank 46, eg., means which connects the main hot gas line 34 to the refrigerant line section 44 located between the outlet of condenser 40 and the inlet of receiver tank 46. The means in the third refrigerant flow path 130 include a tee 132 in hot gas line 34, located between the discharge side D of compressor 30 and condenser inlet controllable valve CIS, a tee 134 in line 44 located between check valve 48 and the inlet of receiver tank 46, and a line 136 connected between tees 132 and 134 which includes a controllable valve RTPS and a check valve 138. As will be described relative to FIGS. 2 and 3, valve RTPS, under the control of electrical control means 18, functions to pressurize receiver tank 46 in response to predetermined system parameters, to force refrigerant in receiver tank 46 to flow into an active portion of system 10. Thus, line 136 is used strictly as a pressure line, enabling a relatively small tubing size to be used.

A fourth refrigerant flow path 140 includes means which connects condenser coil 40 to the low pressure side 71 of system 10, eg., means which connects the outlet side of condenser coil 40 to the inlet side of accumulator 86. The means in the fourth refrigerant flow path 140 include a tee 142 in refrigerant line section 44, located between the outlet of condenser 40 and check valve 48, a tee 144 in suction line 74 located between the outlet of the second flow path 88 of heat exchanger 64 and the inlet of accumulator 86, and a line 146 connected between tees 142 and 144 which includes a controllable valve CPS and a check valve 148. As will be described relative to FIGS. 2 and 3, valve CPS, under the control of electrical control means 18, functions as a condenser purge valve which drains condenser coil 40 in response to predetermined system conditions, to force refrigerant trapped in condenser coil 40 by normal cycling to flow into an active portion of the system 10.

While line 146 is used to purge refrigerant trapped in condenser coil 40, it should be dimensioned and/or restricted to prevent a sudden release of refrigerant into suction line 74, as flooding of compressor 30 must be avoided. A 0.25 inch (0,635 cm) line is suitable.

When one of the evaporator sections requires heat, the other evaporator section may be in a cooling cycle. The evaporator coil operating in a heating mode or cycle is caused to function by electrical control means 18 as a condenser for the evaporator coil which is operating in a cooling mode or cycle. For example, if evaporator section for service area 14 requires a heating cycle while evaporator section for serviced area 16 requires a cooling cycle, hot gas valve HGS1 and liquid line valve LLS2 will be opened, and condenser inlet valve CIS and suction line valve SLS1 will be closed. Thus, hot gas from compressor 30 will flow through hot gas line 34, tee 120, hot gas line 122, hot gas line section 124, hot gas valve HGS1, distributor 66, and evaporator coil 68, providing heat for defrosting evaporator coil 68, or for maintaining the set point temperature in conditioned space 14. The refrigerant in suction line section 70 will be forced to flow to the expansion valve 96 of evaporator section 62 via the by-pass line 78 which includes check valve 80, flow path 62 of heat exchanger 64, tee 58, liquid line section 56, and the open liquid line solenoid LLS2. In like manner, evaporator section for serviced area 14 may operate in a cooling cycle while evaporator section for serviced area 16 is in a heating cycle.

Valves RTPS and CPS are opened automatically by electrical control means 18 in response to certain system conditions, which include the pressure on the low side 71 of refrigeration system 10, ie., between the outlets of evaporator coils 68 and 100 and the suction side S of compressor 30, and the pressure on the high side 69 of refrigeration system 10, ie., side D of compressor 30. When there is insufficient refrigerant in the active refrigerant flow path, the pressure of the low pressure side 71 of system 10 drops, and the discharge or high pressure side D of compressor 30 drops. When the compressor discharge pressure drops below a predetermined value, such as 200 psig, as detected by the hereinbefore mentioned head pressure switch HPCS, and valve CIS is closed, valve CPS is opened. If the pressure of the low pressure side 71 of system 10 is lower than the pressure of the inactive condenser coil 40, refrigerant trapped in condenser coil 40 through normal unit cycling is automatically transported by the pressure difference to the active part of system 10, ie., to suction line 74, accumulator 86 and compressor 30.

Valve RTPS is opened by electrical control means 18 at the same time as valve CPS, to pressurize receiver tank 46. In addition to valve RTPS opening when valve CPS opens, the arrangement of FIG. 1, wherein line 136 is pressurized at all times, enables valve RTPS to be optionally opened even when valve CPS is closed, responding to low head pressure, regardless of the state of valve CIS.

Figure 2:
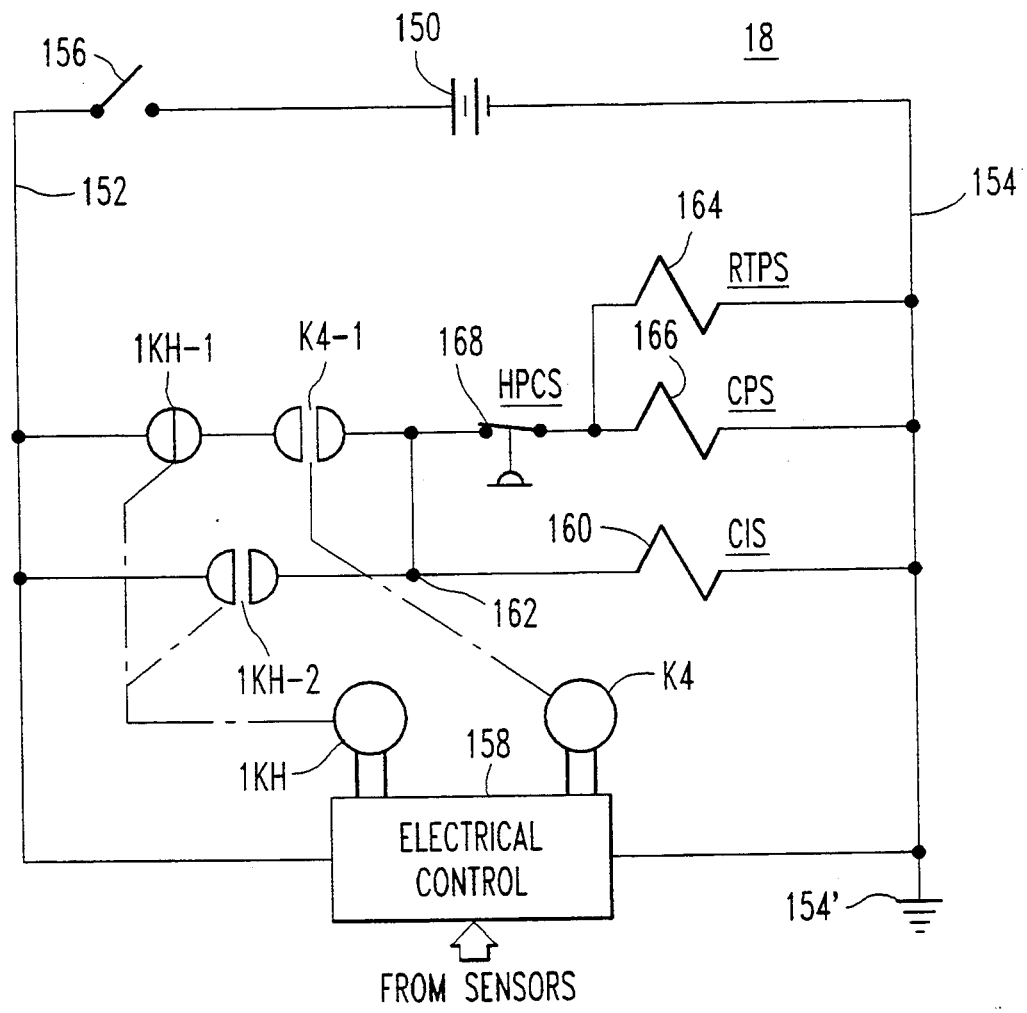
FIG. 2 is an electrical schematic diagram illustrating how certain controllable elements in FIG. 1 are connected to the refrigeration thermostat temperature control in a first embodiment of the invention.
Figure 3:
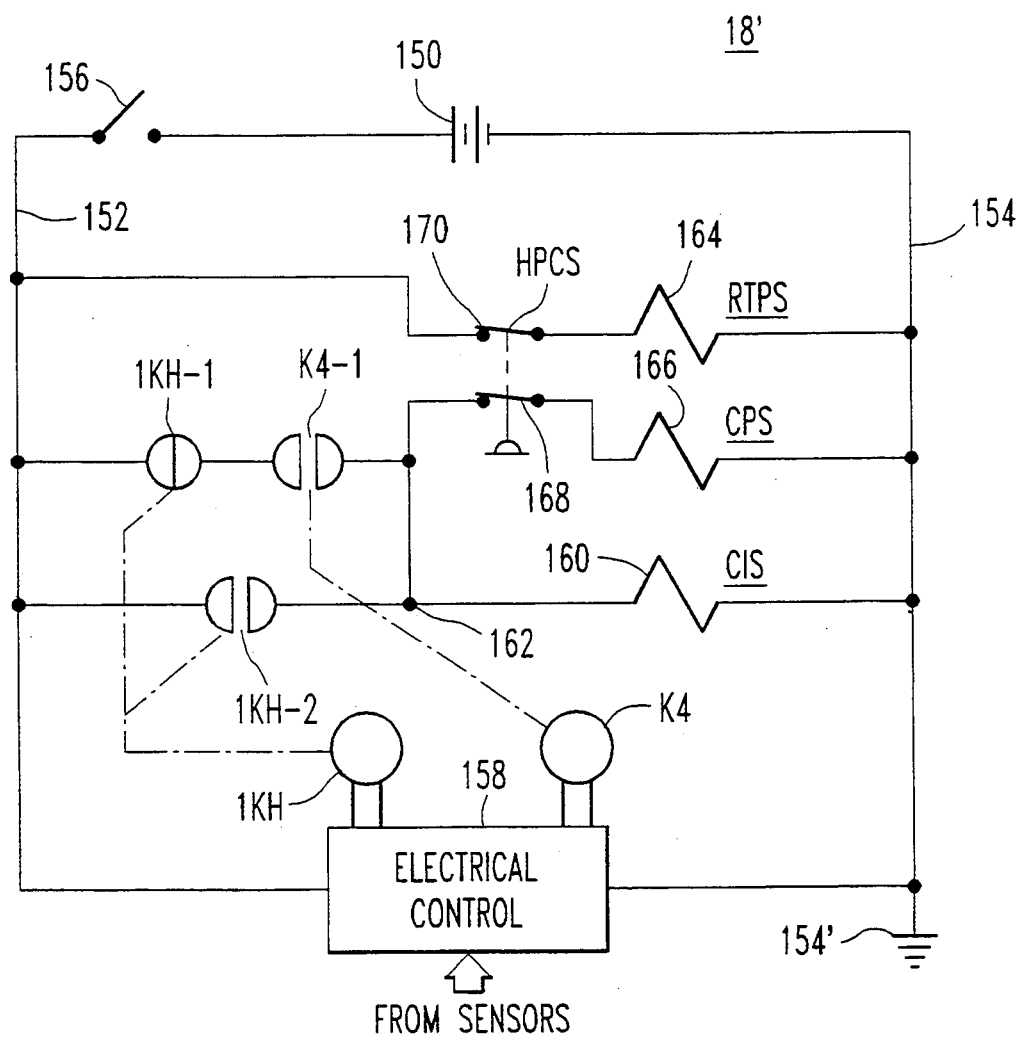
FIG. 3 is an electrical schematic diagram which is similar to FIG. 2, except illustrating how controllable elements of the thermostat shown in FIG. 2 may be connected to provide another embodiment of the invention.

FIG. 2 is a schematic diagram of electrical control means 18 arranged to operate valves RTPS and CPS together, and. FIG. 3 is a schematic diagram of electrical control means 18 arranged to operate valves RTPS and CPS at the same time when valve CIS is closed, and to additionally operate valve RTPS in response to low head pressure without regard to whether valve CIS is closed. Electrical control means 18 is referenced 18' in FIG. 3, to indicate that it has been modified.

Electrical control means 18 includes a source of electrical potential 150, indicated by a battery, with source 150 being connected between first and second electrical conductors 152 and 154 via a unit on/off switch 156. Conductor 154 is grounded as indicated at 154'. A relay 1KH, associated with a portion of electrical control means 18 indicated by reference 158, controls the selection of cooling and heating cycles for the evaporator unit of the associated conditioned space 14, selecting a cooling cycle when de-energized, and a heating cycle when energized. A relay K4, also associated with portion 158 of electrical control means 18, controls the selection of cooling and heating cycles for evaporator unit of the associated conditioned space 16, selecting a cooling cycle when de-energized, and a heating cycle when energized.

A normally open contact 1KH-2 of relay 1KH and a solenoid coil 160 which operates condenser inlet valve CIS are serially connected between conductors 152 and 154. Thus, when valve 1KH is de-energized, valve CIS is de-energized and open, selecting a cooling cycle, and when valve 1KH is energized, valve CIS is energized and closed, enabling a heating or defrost cycle to be initiated by appropriate control of other valves, as hereinbefore described. A normally open contact K4-1 of relay K4, a normally closed contact 1KH-1 of relay 1KH, and solenoid coil 160 of valve CIS are serially connected between conductors 152 and 154. Thus, if the evaporator unit of serviced area 16 is calling for a heating cycle, contact K4-1 will be closed, and if the evaporator unit of serviced area 14 is not in a heating cycle, contact 1KH-1 will be closed, energizing and closing condenser inlet valve CIS, to enable evaporator unit 62 to initiate a heating or defrost cycle. Since there will normally be insufficient refrigerant available in system 10 to allow both evaporator units to efficiently perform heating cycles at the same time, they are suitably interlocked, as indicated by the addition of the normally closed contact 1KH-1 of relay 1KH in the heat circuit of relay K4. The interlocking arrangement shown gives heating cycle preference to conditioned space 14, but other interlocking arrangements may be used.

The input to solenoid coil 160 from conductor 152, via the hereinbefore mentioned relay contacts, with this input being indicated by junction 162, is also connected to one side of solenoid coils 164 and 166 via a contact 168 of compressor head pressure switch HPCS, which is closed below a predetermined head pressure, such as 200 psig, and open at and above this predetermined head pressure. Solenoid coils 164 and 166, which are respectively associated with valves RTPS and CPS, are connected to conductor 154 to complete the electrical circuit.

Depending upon the type of electrical control means 18 utilized, high pressure switch HPCS may be located on the "ground" sides of valves CPS and RTPS, instead of on the "high" sides illustrated in FIG. 2. In other words, the "left-hand" sides of valves CPS and RTPS, with respect to one viewing FIG. 2, would be connected directly to junction 162, and their "right-hand" sides would be connected to conductor 154, and ground 154', via contact 168 of high pressure switch HPCS.

Thus, when either of the evaporator units is in a heating or defrost cycle, valves RTPS and CPS are enabled. Should the compressor discharge or head pressure fall below the predetermined value monitored by pressure switch HPCS, both valves will be energized and opened by electrical control means 18, with valve RTPS pressuring receiver tank 46 and valve CIS enabling refrigerant trapped in condenser coil 40 to flow to the low pressure side 71 of system 10, in response to the pressure difference between the low pressure side and the pressure in condenser coil 40. Thus, additional refrigerant is added to the active refrigerant flow path only when one of the evaporator sections is in a heating or defrost cycle, and only then in response to actual need, as detected by a predetermined low compressor head pressure. The amount of actual flow of refrigerant from condenser coil 40 and the low pressure side of system 10 is further metered in direct response to the magnitude of the pressure differential between condenser coil 40 and the suction or low pressure side of system 10, as well as to the flow diameter selected for line 146.

Line 136 is usually pressurized in the prior art only when a three-way mode selection valve switches the hot gas output of compressor 40 from a cooling flow path to a heating flow path. It would be desirable to be able to pressurize receiver tank 46 in response to low compressor head pressure, without regard to the heating or cooling cycles taking place in the system. Since the arrangement of FIG. 1 pressurizes flow path 130 at all times, this option is available. More specifically, as shown in FIG. 3, compressor head pressure switch HPCS may have an additional contact 170, or contacts 168 and 170 may be associated with two different pressure switches, having the same, or different pressure switching points, as desired. Contact 168, which is only connected to solenoid coil 166 of valve CPS in FIG. 3, is connected to input 162 from the relay contacts, as in FIG. 2, and thus condenser coil 40 will only be purged when it is inactive, and the compressor head pressure is below a predetermined value. Pressure switch contact 170 connects solenoid coil 164 of valve RTPS serially between conductors 152 and 154. Thus, receiver tank 46 will be pressurized in response to low compressor head pressure, whether it is due to extremely low ambient temperature conditions, low refrigerant in the system 10, such as due to leaks, and the like, without regard to the cycle being run in the associated system 10.

As stated relative to the embodiment of FIG. 2, high pressure switch HPCS in FIG. 3 may, in certain control configurations, be connected to the "ground" sides of valves CPS and RTPS, instead of to the "high" sides shown in FIG. 3. In other words, the "left-hand" sides of valves CPS and RTPS would be connected directly to junction 162 and conductor 152, respectively, and their "right-hand" sides would be connected to conductor 154 and, ground 154', via contacts 168 and 170, respectively, of high pressure switch HPCS.

We claim:

1. In a transport refrigeration system having high and low pressure sides, and control means which controls the temperature in a served space via heating and cooling cycles using hot refrigerant gas from a refrigerant compressor, with the high pressure side including a discharge side of the compressor, a condenser coil, a refrigerant receiver tank, and an evaporator coil associated with the served space, and with the low pressure side extending from the evaporator coil to a suction side of the compressor, the improvement comprising:

first controllable refrigerant flow path means connected between the condenser coil and the low pressure side of the system, and second controllable refrigerant flow path means connected between the discharge side of the compressor and the receiver tank, said control means controlling said first and second controllable refrigerant flow path means in response to predetermined system parameters, said control means, in response to predetermined system parameters, causing said first controllable refrigerant flow path means to purge the condenser coil of refrigerant by allowing refrigerant trapped in the condenser coil to flow to the low pressure side of the system in response to pressure differential between the condenser coil and the low pressure side of the system, said control means, in response to predetermined system parameters, causing the second controllable refrigerant flow path means to pressurize the receiver tank and force refrigerant to flow from the receiver tank to the evaporator coil.

2. In the transport refrigeration system of claim 1 wherein the control means includes means responsive to compressor discharge pressure and means responsive to the system being in a heating cycle, causing the first controllable refrigerant flow path means to purge the condenser coil only during a heating cycle when the compressor discharge pressure is below a predetermined value.

3. In the transport refrigeration system of claim 1 wherein the control means includes pressure means responsive to compressor discharge pressure, causing the second controllable refrigerant flow path means to pressurize the receiver tank in response to the compressor discharge pressure being below a predetermined value, regardless of whether the system is in a heating or a cooling cycle.

4. In the transport refrigeration system of claim 1 wherein the control means includes pressure means responsive to compressor discharge pressure and means responsive to the system being in a heating cycle, with the control means causing the first controllable refrigerant flow path means to purge the condenser coil only during a heating cycle when the compressor discharge pressure is below a predetermined value, and wherein the control means causes the second controllable refrigerant flow path means to pressurize the receiver tank in response to the compressor discharge pressure being below a predetermined value, regardless of whether or not the control means is causing the first controllable refrigerant flow path means to purge the condenser coil.

5. In the transport refrigeration system of claim 1 wherein the control means includes first pressure means responsive to compressor discharge pressure and means responsive to the system being in a heating cycle, with the control means causing the first controllable refrigerant flow path means to purge the condenser coil only during a heating cycle when the first pressure means indicates the compressor discharge pressure is below a first predetermined value, and wherein the control means includes second pressure means responsive to compressor discharge pressure, with the control means causing the second controllable refrigerant flow path means to pressurize the receiver tank when the compressor discharge pressure indicated by the second pressure means is below a second predetermined value, regardless of whether or not the control means is causing the first controllable refrigerant flow path means to purge the condenser coil.

6. In the transport refrigeration system of claim 1 including first controllable valve means disposed to control the flow of refrigerant from the compressor to the condenser coil, second controllable valve means disposed to control the flow of refrigerant from the compressor to the evaporator coil, and wherein the second controllable refrigerant flow path means includes third controllable valve means, and including a hot gas line connected to directly connect the discharge side of the compressor to each of said first, second and third controllable valve means.

7. In the transport refrigeration system of claim 1 wherein the refrigeration system is a compartmentalized transport refrigeration system which holds selected set point temperatures in at least first and second served spaces via heating and cooling cycles via first and second evaporator coils associated with the first and second served spaces, with the control means including means enabling first controllable refrigerant flow path means to purge the condenser coil when either of the served spaces is in a heating cycle.

* * * * *